US006960898B2

(12) United States Patent
Sato

(10) Patent No.: US 6,960,898 B2
(45) Date of Patent: Nov. 1, 2005

(54) CONTROL UNIT FOR CONTROLLING A SYNCHRONOUS MOTOR

(75) Inventor: Yoshinobu Sato, Tokyo (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 0 days.

(21) Appl. No.: 10/942,943

(22) Filed: Sep. 17, 2004

(65) Prior Publication Data

US 2005/0088135 A1 Apr. 28, 2005

(30) Foreign Application Priority Data

Oct. 27, 2003 (JP) ........................................ 2003-366242

(51) Int. Cl.[7] .............................. H02P 1/46; H02P 5/28; H02P 7/36
(52) U.S. Cl. ........................ 318/717; 318/700; 318/716; 318/560; 318/138; 318/254; 318/439
(58) Field of Search ............................... 318/700–779, 318/138, 254, 430–434, 439, 453, 459, 471, 474, 560

(56) References Cited

U.S. PATENT DOCUMENTS

| | | | | |
|---|---|---|---|---|
| 5,077,507 | A | * 12/1991 | Mitani et al. | 318/569 |
| 5,175,479 | A | * 12/1992 | Tajima et al. | 318/560 |
| 5,444,340 | A | * 8/1995 | Tamaki et al. | 318/139 |
| 5,561,355 | A | * 10/1996 | Ideguchi et al. | 318/721 |
| 6,153,993 | A | * 11/2000 | Oomura et al. | 318/434 |
| 6,281,656 | B1 | * 8/2001 | Masaki et al. | 318/700 |
| 6,501,243 | B1 | * 12/2002 | Kaneko et al. | 318/700 |
| 6,737,828 | B2 | * 5/2004 | Kiuchi et al. | 318/779 |
| 2004/0257027 | A1 | * 12/2004 | Matsuo et al. | 318/722 |

FOREIGN PATENT DOCUMENTS

| | | | | |
|---|---|---|---|---|
| JP | 11-160101 | * | 6/1999 | H02P/21/00 |
| JP | 11-206198 | * | 7/1999 | H02P/21/00 |
| JP | 2003-319682 | * | 11/2003 | H02P/6/16 |
| JP | 2004-180458 | * | 6/2004 | H02P/5/41 |

* cited by examiner

Primary Examiner—Marlon T. Fletcher
Assistant Examiner—Tyrone Smith
(74) Attorney, Agent, or Firm—Rabin & Berdo, P.C.

(57) ABSTRACT

A control unit is provided that controls a motor that opens and closes a door of an electric train such that, if an abnormality is detected by a position sensor, continuation of its open/closing operation can be maintained. The control unit includes an arrangement for computing the actual rotation speed and the magnetic polar position of the motor; a position sensor abnormality-detecting identifier unit for detecting abnormalities in the output of the position sensor; and a first controlling arrangement that generates voltage-instructing values by applying the magnetic polar position so as to cause a speed detection value to correspond to the speed instruction value. The control unit further includes a second controlling arrangement, which in turn includes an F/V arithmetic unit 24 and integrator 25; and a switcher unit 27. The F/V arithmetic unit 24 generates a voltage instruction value having a specific magnitude and phase corresponding to the speed instruction value by utilization of magnetic polar position data that is obtained via integration of a frequency corresponding to the speed instruction value. The switcher unit 27 selects either of the first and second controlling arrangements so as to generate voltage-instructing values for a power converter 3. When the output of the position sensor is normal, the switcher unit 27 selects a specific voltage-instructing value delivered from the first controlling arrangement, whereas if the position of the sensor 5 is abnormal, the switcher unit 27 selects a specific voltage-instructing value delivered from the second controlling arrangement.

3 Claims, 3 Drawing Sheets

CONTROL UNIT FOR CONTROLLING A SYNCHRONOUS MOTOR

CROSS-REFERENCE TO RELATED APPLICATION

This application claims the benefit of priority under 35 USC 119 of Japanese patent application number 2003-366242, filed Oct. 27, 2003, the entire disclosure of which is incorporated herein by reference.

BACKGROUND OF THE INVENTION

The present invention relates to a control unit for controlling the operation of a permanent-magnet-type synchronous motor equipped with a position sensor so as to drive the motor with rotation speed that is controlled. More particularly, the present invention relates to a control unit for of a permanent-magnet-type synchronous motor suitable for opening and closing doors of an electric train (such as dual-panel sliding doors of subway cars).

FIG. 3 is a block diagram showing an example of a conventional motor-control unit. The construction and operation of this control unit will be described below. Reference number 1 represents a 3-phase permanent-magnet-type synchronous motors, such as a linear motor for driving a door 2 so as to enable it to open and close. The door 2 includes a pair of door panels that are moved away from one another to open the door 2 and move toward one another to close the door 2. These door panels are linked to motor 1, and the opening and closing speed of the door 2 is proportional to the rotary speed of the motor 1. Power is supplied to the motor 1 from a power converter 3, consisting of an inverter or the like. Reference number 4 represents a power source such as a battery connected to the power converter 3. Reference number 6 represents a closed position-detecting sensor for detecting when the door 2 is fully closed and remains in the closed position. A closed-position detection signal generated by the sensor 6 transmitted to a speed-instruction arithmetic unit 10, which arithmetically processes a speed instruction value (or speed command valve) 10a for motor 1 based on a door opening-and-closing instruction 106. The speed instruction valve 106 is an analog signal having a level that is proportional to the desired opening or closing speed.

Reference number 5 represents a position sensor for detecting the actual magnetic-polar position of the motor, corresponding to the shaft-angle of the motor 1. The position sensor 5 may be an encoder outputting a square wave during 180 degrees of the three phases (UVW). The detection signal output from the position sensor 5 is transmitted to a motor-speed arithmetic unit 11 and a motor-position arithmetic unit 15. The motor-position arithmetic unit 15 arithmetically generates an actual magnetic-polar-position signal 15a and an actual door-position signal 15b, and the arithmetically processed door-position signal 15b is then transmitted to the speed-instruction arithmetic unit 10.

Reference number 12 represents a subtraction unit that computes the difference between a speed instruction valve 10a output from the speed-instruction arithmetic unit 10 and an actual speed value determined by the motor-speed arithmetic unit 11. Reference number 13 represents a speed adjuster that computes the propelling power or motor drive power needed to fully eliminate the difference. Reference number 14 represents a current-instruction arithmetic unit, which arithmetically processes current instruction values pertaining to d-axis and q-axis components in a "d, q" coordinate system, based on a propelling-power instruction value output from the speed adjuster 13.

Reference number 7 is a current detector for detecting the DC current supplied from the power converter 3 to the motor 1. Reference number 16 is a coordinate converter, which arithmetically processes the current at the coordinates "d and q" based on the detected current value and actual magnetic polar position data output from the motor-position arithmetic unit 15. Reference numbers 17 and 18 are subtraction units, which arithmetically process the difference between current instruction values related to d-axis and q-axis components that have been output by the current-instruction arithmetic unit 14, and the current detection values related to d-axis and q-axis components output from the coordinate converter 16.

The difference values output by the subtraction units 17 and 18 are then transmitted to a d-axis current adjuster 19 and a q-axis current adjuster 20, which respectively generate a d-axis voltage instruction value and a q-axis voltage instruction value so as to fully cancel each difference value.

The d-axis voltage instruction value and the q-axis voltage instruction value are transmitted to a polar-coordinate converter 21, which computes the magnitude of a voltage instruction vector and its phase, and the computed results are then transmitted to a voltage-instruction arithmetic unit 22. The unit 22 uses the voltage instruction vector and phase to generate signals to drive the converter 10 so as to produce AC drive current at phases U, V, and W for driving the motor 1.

Next, based on the voltage instruction vector output from the polar-coordinate converter 21 and the magnetic polar position data 15a output from the motor-position arithmetic unit 15, the voltage-instruction arithmetic unit 22 generates signals to drive the converter 10 so as to produce generally sinusoidal drive current at phases u, v, and w for driving the motor 1.

Reference number 23 represents a position-sensor abnormal-condition identifier, which identifies whether the signal output from the position sensor 5 is normal or abnormal. For example, an output of (L, L, L) or (H, H, H) from the position sensor 5 would be indicative of an abnormality. If an abnormality is identified, the identifier 23 causes the supply of power to the motor 1 via the power converter 3 to be halted or an appropriate alarm to be generated.

In the above constitution, when door 2 is closed, the speed-instruction arithmetic unit 10 storing the instruction for closing the door 2 computes the speed instruction value 10a for the movement of the door 2 to the closing position. As previously described, the movement speed of the door 2 is proportional to the rotation speed of the motor 1 driving the door 2, and the speed arithmetic unit 11 computes the actual speed by referring to the data output from the position sensor 5. Next, the speed adjuster 13 computes a propelling-power instruction value so that difference between the speed instruction value and the detected speed value can be canceled.

Based on the propelling-power instruction value from speed adjuster 13, the voltage instruction values are computed via the current-instruction arithmetic unit 14, subtraction units 17 and 18, and the current adjusters 19 and 20. Then, a voltage instruction vector is generated via the polar-coordinate converter 21. Next, the voltage instruction vector is converted into individual voltage instructions corresponding to each of the three phases by the voltage-instruction arithmetic unit 22, before eventually being transmitted to the power converter 3 so that the motor 1 can be driven.

The motor 1 is driven to move the door 2 to the closed position (for example) by causing the motor 1 to rotate at an rpm in pursuit of a speed instruction value output from the speed-instruction arithmetic unit 10. When the door-closing position-detecting sensor 6 detects that the door 2 has just arrived at the closing position, a door-closing detection signal is transmitted to the speed-instruction arithmetic unit 10 to cause the speed instruction value to be reset to zero.

In response, the power converter 3 discontinues the supply of power to the motor 1, thereby causing the door 2 to halt itself at the closed position.

When the door 2 is opened, the speed-instruction arithmetic unit 10 storing the door-open instruction computes a speed instruction value for the movement of the door 2 to the open position so as to enable the motor 1 to be driven via the same steps executed for closing the door 2. When the door position determined by the position arithmetic unit 15 has just arrived at the fully open position, the door speed-instruction arithmetic unit 10 resets the speed instruction value to zero. In response, the power converter 3 halts the supply of power to the motor 1, thereby causing the door 2 to stop at the fully open position.

When the position-sensor abnormality identifier 23 identifies that an abnormal signal has been output from the position sensor 5 while the door 2 is in the process of opening or closing, this in turn causes the controlling precision to be reduced, as the speed arithmetic unit 11 and the position arithmetic unit 15 can no longer determine a precise values for the motor's speed and magnetic polar position. In response, using the abnormality detection signal output from the position-sensor abnormality identifier 23, the power converter 3 discontinues the supply of power to the motor 1.

For reference, a controller with a construction substantially identical to that explained above is disclosed by Yoshihiko Satoh, et al., "On the development of a linear-motor-driven door system suitable for a commuter train", (in translation), Treatise No. 114, Proceedings of the 1999 Japan Industry Applications Society Conference, The Institute of Electrical Engineers of Japan, 1999, pages 359–362.

In the above-cited prior art, whenever an abnormality in the output of the position sensor 5 is detected by the position-sensor abnormality identifier 23, the operation of the motor 1 is suspended. As a result, when the above prior art is applied to a sliding door 2 at the side of a car in an electric train, the operation for opening and closing the door must be suspended during opening or closing. As the door is not fully closed, unwanted delays will occur.

SUMMARY OF THE INVENTION

An object of the present invention is to solve the problem described above. A related object is to provide an effective system that is capable of continuously opening and closing the doors of electric trains even if an abnormality is detected by a position sensor.

Accordingly, the present invention is intended to provide a control unit capable of controllably and continuously opening and closing a train door even after detecting an abnormality in the signal output from the position sensor.

According to a first aspect of, the present invention, a control unit is provided that is capable of controlling a permanent-magnet-type synchronous motor incorporating a position sensor by operating a power converter, wherein the control unit comprises:

a speed-computing means for computing the actual rotation speed of the above motor based on a position-detection signal output from the position sensor;

a magnetic-polar-position computing means for computing the magnetic polar position of the above motor based on a position-detection signal output from the position sensor;

a position-sensor abnormality-detecting means for detecting abnormalities in the position detection signal output from the position sensor;

a first controlling means for generating a voltage instruction value for a power converter by referring to the magnetic polar position so as to cause a speed detection value generated by the speed-computing means so as to be equal to the speed instruction value;

a second controlling means for generating a voltage instruction value having a specific magnitude and phase corresponding to the speed instruction value by applying a specific magnetic polar position detected from a frequency corresponding to the speed instruction value; and a switching means for providing the power converter with a voltage instruction value generated by the second controlling means by selecting either of the first and second controlling means;

wherein, when it is identified by the position-sensor abnormality-detecting means that an output signal from the position sensor is normal, the switching means provides the power converter with a specific voltage instruction value delivered from the first controlling means; wherein, when it is identified by the position-sensor abnormality-detecting means that the output signal from the position sensor is abnormal, the switching means provides the power converter with a specific voltage instruction value delivered from the second controlling means.

According to a second aspect of the present invention, the control unit may further be characterized in that the above permanent-magnet-type synchronous motor drives a door (of an electric train) so as to enable it to open and close; and whenever it is identified that the output signal from the position sensor is normal, the supply of power to the motor is halted when the door is fully open or fully closed, and if the output signal from the position sensor is abnormal, the supply of power to the motor is continued except for cases in which the door is fully closed.

In accordance with a third aspect of the present invention, the control unit may also be further characterized in that the above permanent-magnet-type synchronous motor drives a door (of an electric train) so as to enable it to open and close; and in that the control unit additionally includes:

a detecting means for detecting that the door has been fully closed; and, a memory means for memorizing that the output signal from the position sensor has been identified as normal, and also for memorizing the door position as of the moment at which the detecting means has detected that the door has been fully closed;

wherein, whenever an output signal from the position sensor is identified as normal, and also whenever the detecting means detects that the door has been fully closed, through application of the door position memorized by the memory means, the motor is driven so as to open and close the door.

According to the first aspect, even when an output signal from the position sensor is identified as abnormal, due to the functional operation of the second controlling means, it is possible to continuously drive the above permanent-magnet-type synchronous motor in correspondence with a predetermined speed instruction value.

According to the second aspect, while the output signal from the position sensor remains normal, it is possible to reduce power consumption when fully opening the door. On the other hand, when the output signal from the position sensor detects an abnormality, by continuously supplying power to the motor by causing the speed instruction value to be reset to zero when the door is fully opened, even when the door is forced to move due to the intentional application of an unwanted external force, by generating resistant force it is possible to prevent the door from being unduly moved.

According to the present third aspect, it is possible to eliminate any erroneous difference between the door positional data obtained by integrating the speed instruction value with the actual door position, and thus, even when the signal output from the position sensor becomes abnormal, it is possible to stably control the operations for opening and closing the door.

DESCRIPTION OF THE PREFERRED EMBODIMENTS

Figure 1:
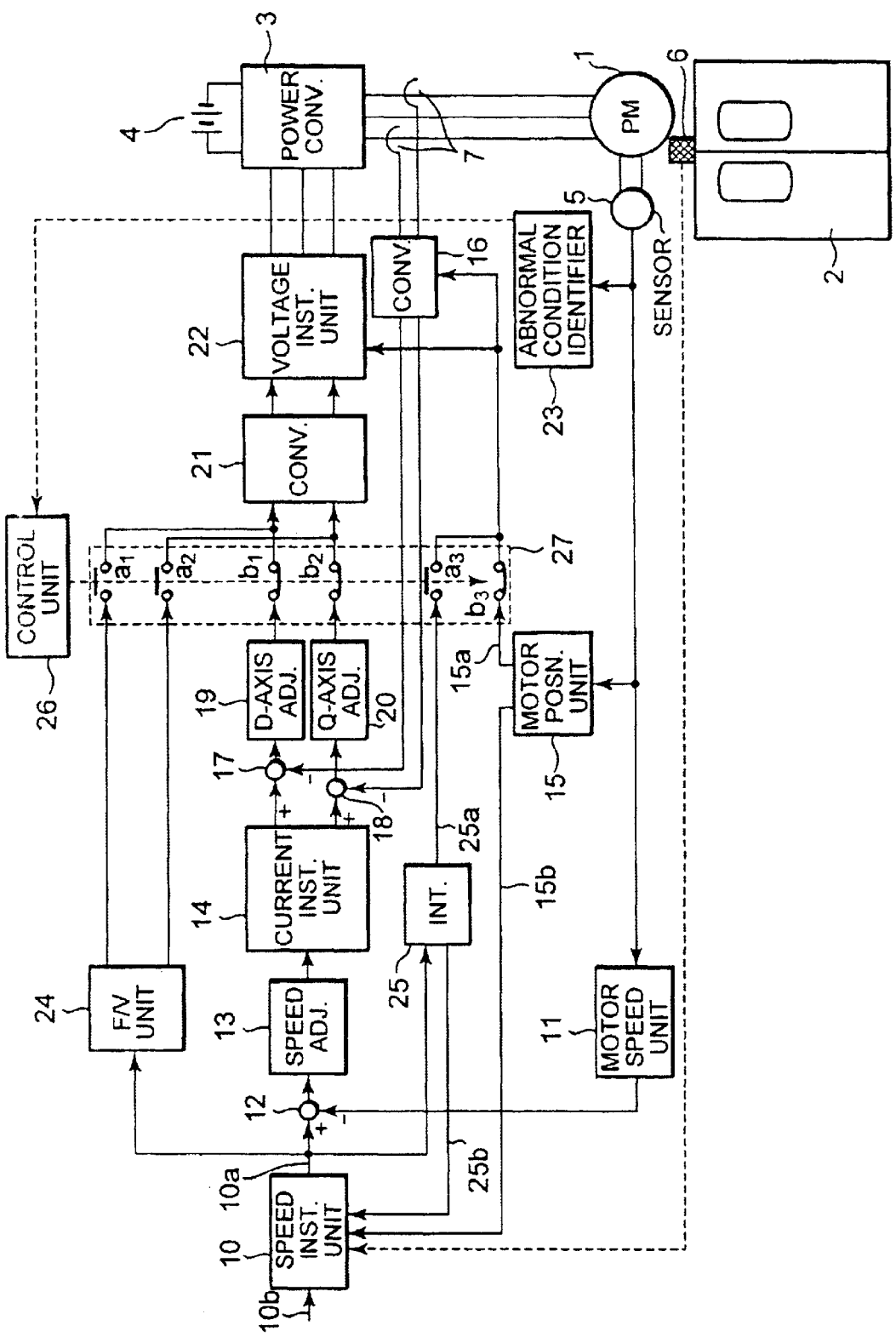
FIG. 1 is a block diagram of the control unit according to a first embodiment of the present invention.
Figure 3:
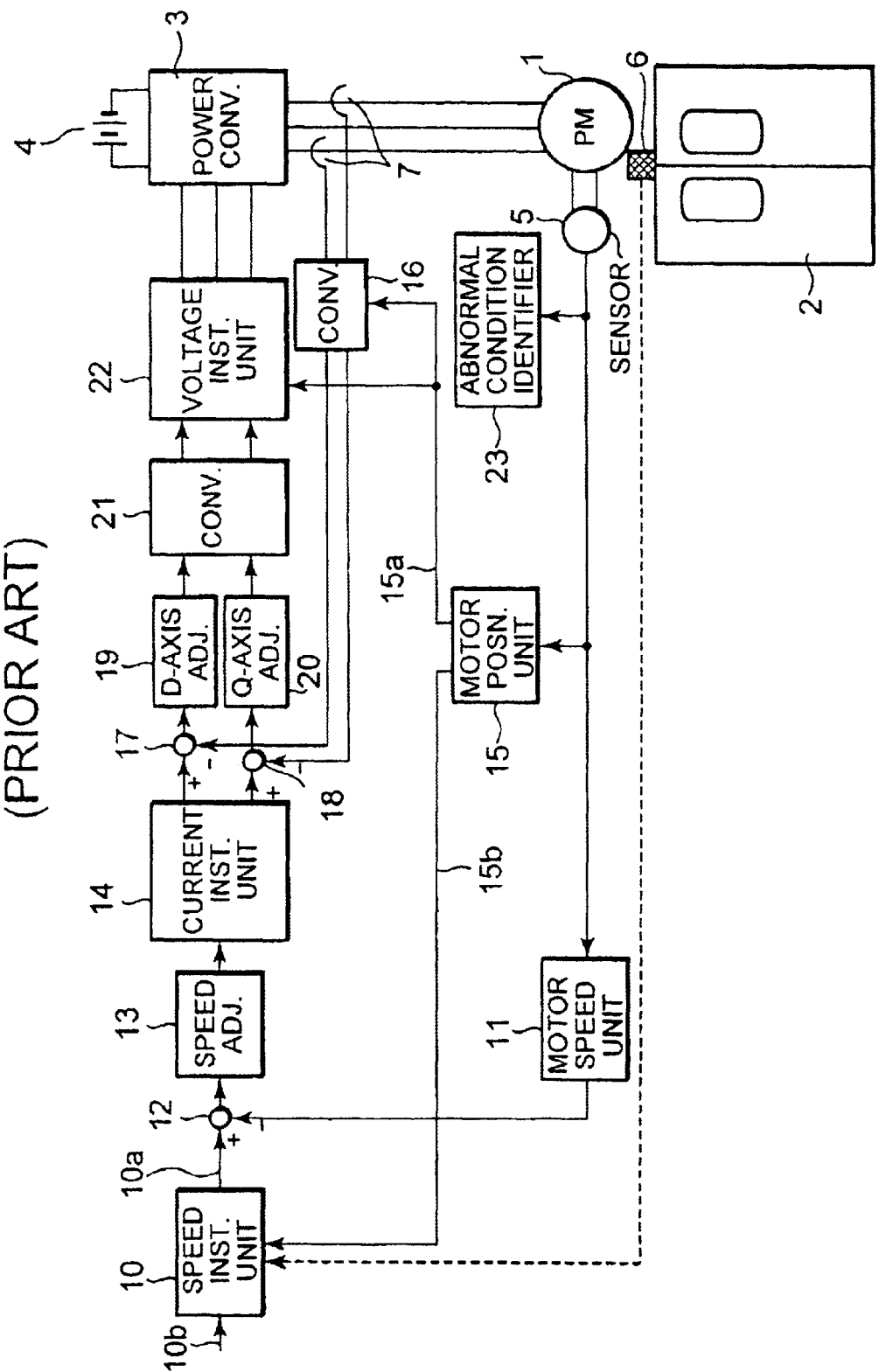
FIG. 3 is a block diagram of a control unit according to a prior art.

In the circuit diagram shown in FIG. 1, an F/V arithmetic unit 24, integrating unit 25, switcher control unit 26, and switcher unit 27, have been added to the arrangement shown in FIG. 3. Familiarity with the description of FIG. 3 that was provided above will be assured in the following discussion.

The F/V arithmetic unit 24 (here, "F" expresses frequency, proportional to the speed-instruction value, and "V" stands for voltage) receives a speed-instruction-value signal 10a from the speed-instruction arithmetic unit 10. The F/V arithmetic unit 24 initially computes the magnitude and phase of a voltage instruction value corresponding to the received speed-instruction-value signal, and then discretely generates a d-axis voltage instruction value and a q-axis voltage instruction value. The voltage instruction values computed by the F/V can respectively be input into the polar-coordinate converter 21 via a pair of normally open contacts a1 and a2 of the switcher unit 27.

Output signals from a d-axis current adjuster 19 and a q-axis current adjuster 20 are input into the polar-coordinate converter 21 via a pair of normally closed contacts b1 and b2.

The integrating unit 25 computes the position of the door 2 and the actual magnetic polar position of the motor 1 by integrating frequencies corresponding to the speed instruction value 10a output from the speed-instruction arithmetic unit 10. A magnetic-polar-position signal computed by the integrating unit 25 can be transmitted to a voltage-instruction arithmetic unit 22 and a coordinate converter 16 via a normally open contact a3. The magnetic-polar-position signal 15a output from a position arithmetic unit 15 is transmitted to the voltage-instruction arithmetic unit 22 and the coordinate converter 16 via a constantly closed contact b3. The door-position signal 25b computed by the integrating unit 2 is transmitted to the speed-instruction arithmetic unit 10.

Note that the constantly open contacts a1, a2, and a3, and the normally closed contacts b1, b2, and b3, are linked to each other via a control-switching signal output from the switcher control unit 26.

A position-sensor abnormality detection signal output from the position-sensor abnormality identifier 23 is transmitted to the switcher control unit 26, which outputs the control-switching signal only when the position-sensor abnormality detection signal is received.

Referring still to the circuit diagram shown in FIG. 1, a specific block consisting of the following constituents corresponds to a first controlling means including: the speed-instruction arithmetic unit 10, the subtraction unit 12, the current-instruction arithmetic unit 14, the subtraction units 17 and 18, the d-axis and q-axis current adjusters 19 and 20, the switches b1 and b2, the polar-coordinate converter 21, and the voltage-instruction arithmetic unit 22. However, from a broad viewpoint, the first controlling means further includes the following: the position sensor 5, the speed arithmetic unit 11, the position arithmetic unit 15, the contact b3, the current detector 7, and the coordinate converter 16.

On the other hand, the FJV arithmetic unit 24, the switches a1 and a2, the polar-coordinate converter 21, the voltage-instruction arithmetic unit 22, the integrator 25, and the switch a3 correspond to a second controlling means.

Next, the operation of the control unit shown in FIG. 1 are described below.

When the signal output from the position sensor 5 remains normal, all of the switches a1 to a3 and b1 to b3 of the switcher 27 remain in the state shown in FIG. 1, and thus the operation of the circuit is substantially identical to that shown in FIG. 3.

If the signal output from the position sensor 5 becomes abnormal, the position-sensor abnormality identifier 23 outputs a position-sensor abnormality detection signal, which is then transmitted to the switcher control unit. In response, the switcher control unit 26 outputs a control-switching signal to cause the switches a1 to a3 of the switcher unit 27 to be closed and to cause the switches b1 to b3 to be opened.

As a result, an arithmetic result output from the FJV arithmetic unit 24 is used for generating the d-axis voltage instruction value and the q-axis voltage instruction value to be delivered to the polar-coordinate converter 21. Accordingly, this in turn prevents a speed detection value (computed by the speed-computing arithmetic unit 11 based on the abnormal signal output from the position sensor 5) from being reflected.

Further, an integrated result output from the integrator 25 that is delivered to the voltage-instruction arithmetic unit 22 is used for determining the magnetic polar position of the motor 1, which in turn prevents the magnetic polar position (computed by the position arithmetic unit 15 based on the abnormal signal output from the position sensor 5) from being reflected.

Accordingly, even if the position sensor 5 remains abnormal, it is still possible to cause the voltage-instruction arithmetic unit 22 to compute a specific voltage instruction value corresponding to the speed instruction value in order to further cause the power converter 3 to operate continuously in response to the voltage instruction value so as to drive the motor 1 continuously. As a result of this arrangement, there is no danger of causing the door-opening/closing operation to be suspended during opening or closing, which would otherwise be caused by the discontinued operation of the power converter 3.

As one of the prior arrangements for driving a permanent-magnet-type synchronous motor without using a position sensor, there is a known control unit described in Japanese Patent Publication Laid-Open No. 2000-287494. This control unit is primarily intended to improve stability during low-speed operation and to increase the upper limit of the torque by switching the d-axis and q-axis voltage instruction values for driving a motor at low-speed and high-speed. Accordingly, the essential constitution of this previous control unit is fundamentally different from the principles of the present invention.

Next, another embodiment of the present invention is described below.

As previously described, while the signal output from the position sensor 5 remains abnormal, the actual position of the door 2 can be computed by causing a frequency corresponding to a speed instruction value to be integrated by the integrator 25. Nevertheless, if it is so arranged that the speed instruction value output from the speed-instruction arithmetic unit 10 is reset to zero when the door 2 is fully open to cause the power converter 3 to halt the power supply to the motor 1, and if the door 2 were then forced to move due to an intentional application of an unwanted external force, as there would be no practical means for detecting the forced movement of a door. The door-position data output from the integrator 25 may then differ from the actual door position, thereby causing the motor 1 to become inoperable.

In response to this, according to this embodiment, when the door 2 is placed in the still condition after being fully open, while the signal output from the position sensor 5 remains normal, the speed instruction value output from the speed-instruction arithmetic unit 10 is reset to zero in order to simultaneously cause the power converter 3 to halt the supply of power to the motor 1, thus suppressing power consumption. Conversely, when an abnormal signal is output from the position sensor 5, the speed instruction value is also reset to zero, and the power converter 3 maintains the supply of power to the motor 1 so that the door 2 can be prevented from being forced to move due to the intentional application of an unwanted external force.

Consequently, when the position sensor 5 outputs a normal signal while the door 2 is fully open, it is possible to halt the supply of power in order to reduce power consumption. On the other hand, when the position sensor 5 outputs an abnormal signal, by continuously supplying power to the motor 1 after generating a signal for resetting the speed instruction value to zero while the door 2 remains fully open, a resistant force is generated to prevent the forcible moving of the door 2, thus preventing the door 2 from being unduly moved and further preventing an erroneous difference from being generated between the door-position data computed via integration of the speed instruction value and the actual position of the door 2.

Figure 2:
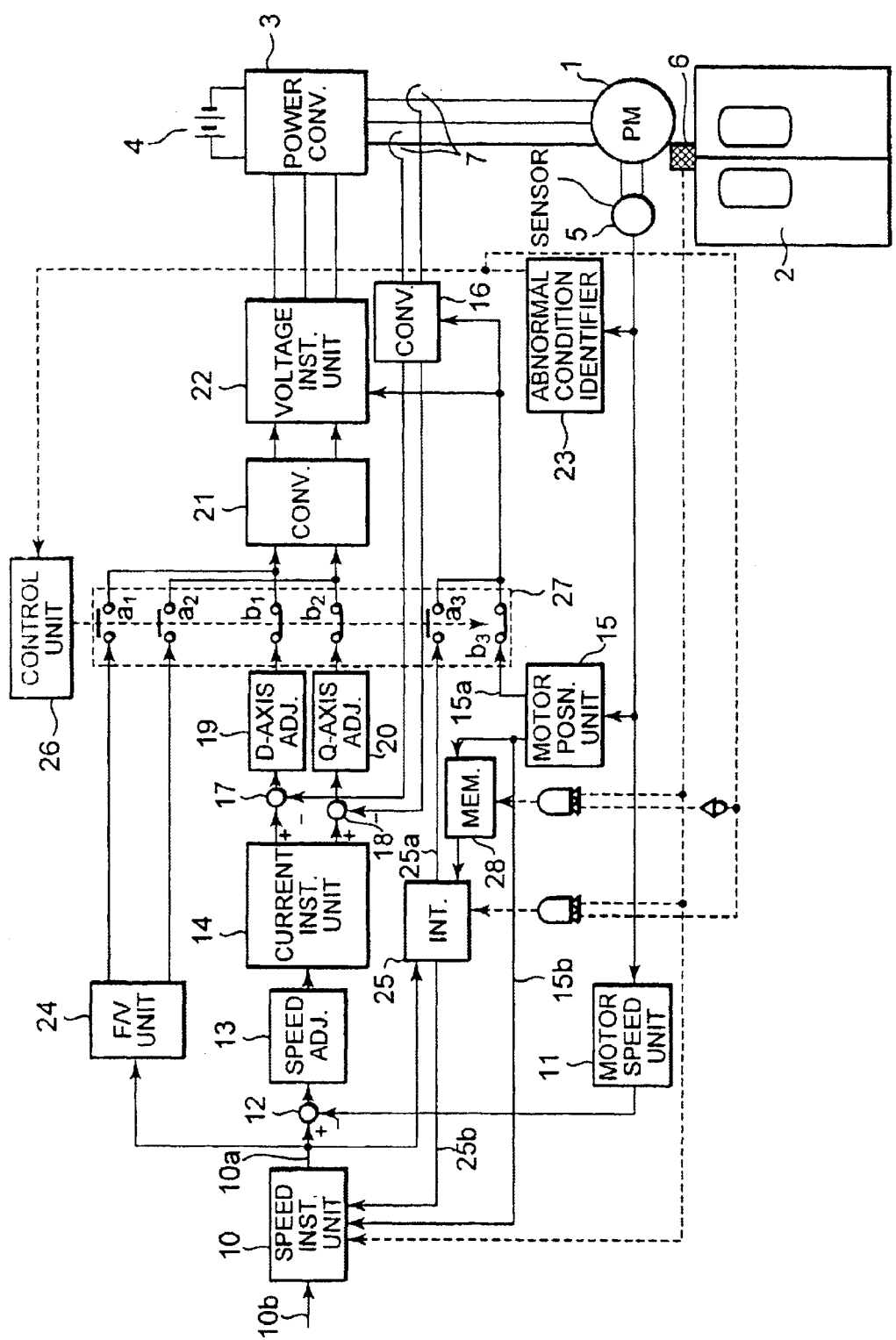
FIG. 2 is a block diagram of the control unit according to a second embodiment of the present invention.

FIG. 2 shows a circuit block diagram according to the second embodiment of the present invention. To the circuit shown in FIG. 2, a closed-position memory 28 for memorizing the door-closed position has been added in addition to the circuit constituents shown in FIG. 1. The closed-position memory 28 stores data on the closed-door position computed by the position arithmetic unit 15.

Next, the operation of the second embodiment will be described below.

When the position-sensor abnormality detection signal output from the position-sensor abnormality identifier 23 remains normal, i.e., at the Low level (if abnormal, the signal is at the High level), but a closed-position detection signal output from the closed-position detecting sensor 6 is at the High level (denoting the closed condition), the closed-position memory 28 memorizes the actual position of the door 2 output from the position arithmetic unit 15 as the closed position thereof.

Further, when the position-sensor abnormality detection signal remains at the High level (denoting an abnormal condition), and the closed-position detection signal remains at the High level (denoting the closed condition), the proper closed position of the door 2 stored in the closed-position memory 28 as the initial value of the integrator 25 is substituted.

Accordingly, even when the signal output from the position sensor 5 is abnormal, since the closed-position memory 28 stores the proper closed position while the position sensor 5 remains normal, when the door 2 is fully closed it is possible to perform a calibrating operation for eliminating the erroneous difference between the actual position of the door 2 and the position of the door 2 computed by the integrator 25.

It will be understood that the above description of the present invention is susceptible to various modifications, changes, and adaptations, and the same are intended to be comprehended within the meaning and range of equivalents of the appended claims.

What is claimed is:

1. A control unit for controlling a permanent-magnet-type synchronous motor incorporating a position sensor, the motor being connected to a power converter, comprising:

a motor speed unit for determining the rotational speed of said motor based on a signal output from said position sensor;

a motor position unit for determining a magnetic polar position of said motor based on the signal output from said position sensor;

a position-sensor abnormality identifier means for detecting abnormalities in the signal output from said position sensor;

a first controlling means for generating voltage-instructing values for said power converter by utilizing the magnetic polar position determined by the motor position unit so as to cause a motor speed detection value detected by said motor speed unit to pursue a speed instruction value;

a second controlling means for generating voltage-instructing values having a magnitude and a phase corresponding to said speed instruction value by employing a magnetic polar position based on a frequency corresponding to said speed instruction value; and a switching means for selecting either said first controlling means or said second controlling means so as to transmit voltage-instructing values generated by either of said controlling means to said power converter, wherein, when said position-sensor abnormality identifier detects that the signal output from said position sensor is normal, said switching means transmits voltage-instructing values from said first controlling means to said power converter and when said position-sensor abnormality identifier detects that the signal output from said position sensor is abnormal, said switching means transmits voltage-instructing values from said second controlling means to said power converter.

2. A control unit for according to claim 1, wherein said motor drives a door so as to enable the door to open and close, when the signal output from said position sensor is identified as normal, the supply of power to said motor is halted when said door is fully open and fully closed, and when the signal output from said position sensor is identified as abnormal, it causes the supply of power to said motor to be continued, except for cases in which said door remains fully closed.

3. A control unit for according to claim 1, wherein said motor drives a door so as to enable the door to open and close, said control unit further comprises a detector that detects when said door is fully closed, and a memory for memorizing the actual door position when the signal output from said position sensor is identified as normal and said detector has detected that said door has been fully closed, when the signal output from said position sensor has been identified as abnormal and said detector has detected that said door has been fully closed, said motor drives said door so as to enable it to open and close by referring to the door position memorized in said memory.

* * * * *

UNITED STATES PATENT AND TRADEMARK OFFICE
CERTIFICATE OF CORRECTION

PATENT NO. : 6,960,898 B2
DATED : November 1, 2005
INVENTOR(S) : Yoshinobu Sato

It is certified that error appears in the above-identified patent and that said Letters Patent is hereby corrected as shown below:

Column 6,
Line 17, "FJV" should be -- F/V --.
Line 36, "FJV" should be -- F/V --.

Signed and Sealed this

Twenty-first Day of February, 2006

JON W. DUDAS
*Director of the United States Patent and Trademark Office*